United States Patent [19]

Metzger

[11] Patent Number: 5,262,708
[45] Date of Patent: Nov. 16, 1993

[54] SYSTEM AND METHOD FOR REDUCING OSCILLATION OF A STEPPER MOTOR

[75] Inventor: Dennis K. Metzger, Kitchener, Canada

[73] Assignee: NCR Corporation, Dayton, Ohio

[21] Appl. No.: 707,589

[22] Filed: May 30, 1991

[51] Int. Cl.$^5$ ............................................. G05B 19/40
[52] U.S. Cl. ..................................... 318/685; 318/696
[58] Field of Search ................................ 318/685, 696

[56] References Cited

U.S. PATENT DOCUMENTS

| | | |
|---|---|---|
| 3,633,084 | 1/1972 | Rakes . |
| 4,636,959 | 1/1987 | Salazar et al. . |
| 4,658,194 | 4/1987 | Richter et al. ........................ 318/696 |
| 4,709,199 | 11/1987 | Wang et al. .......................... 318/696 |
| 4,743,848 | 5/1988 | Krimm et al. ................... 318/696 X |
| 4,916,370 | 4/1990 | Rowan et al. . |
| 5,079,653 | 1/1992 | Gauthier et al. ................. 318/685 X |

OTHER PUBLICATIONS

"How We Made Sense Out of the Sensorless Motor", *Micro Linear*, Electronic Design Magazine, Jul. 12, 1990. NOTE: This article was published after Applicant's date of invention.

*Primary Examiner*—William M. Shoop, Jr.
*Assistant Examiner*—Karen Masih
*Attorney, Agent, or Firm*—Robert S. Hulse

[57] ABSTRACT

A system and method are disclosed for reducing oscillation of a stepper motor. In one embodiment, the system includes an oscillation indicator circuit that is connectable to a stepper motor unit having a stepper motor and a stepper controller with a manually adjustable potentiometer, the stepper motor being responsive to varying resistances of the potentiometer. The oscillation indicator includes a detector circuit, and a latch/LED (light emitting diode) display circuit. The oscillation indicator provides an oscillation-indication signal and a LED display as an indication (representation) of oscillation of the motor during execution of a step, the indication representing a back EMF (electromotive force) of the motor. Upon viewing the indication, a user manually adjusts the potentiometer to reduce the indication and the oscillation. In another embodiment, where the potentiometer is processor-adjustable, the system also includes a microprocessor coupled to the potentiometer of the stepper controller and to the oscillation indicator, and responsive to the oscillation-indication signal for automatically adjusting the potentiometer to reduce the oscillation. In both embodiments, the method employed by the system includes (a) producing an indication of the oscillation of the motor, the indication being representative of a back EMF of the motor, and (b) adjusting the potentiometer to a selected resistance level for reducing the back EMF indication and, hence, the oscillation.

17 Claims, 21 Drawing Sheets

MOTOR SHAFT
UNDAMPED OSCILLATION
( 2.3 nv = 0.001" LINEAR DISPLACEMENT )

MOTOR SHAFT
UNDAMPED OSCILLATION
( 2.3 nv = 0.001" LINEAR DISPLACEMENT )

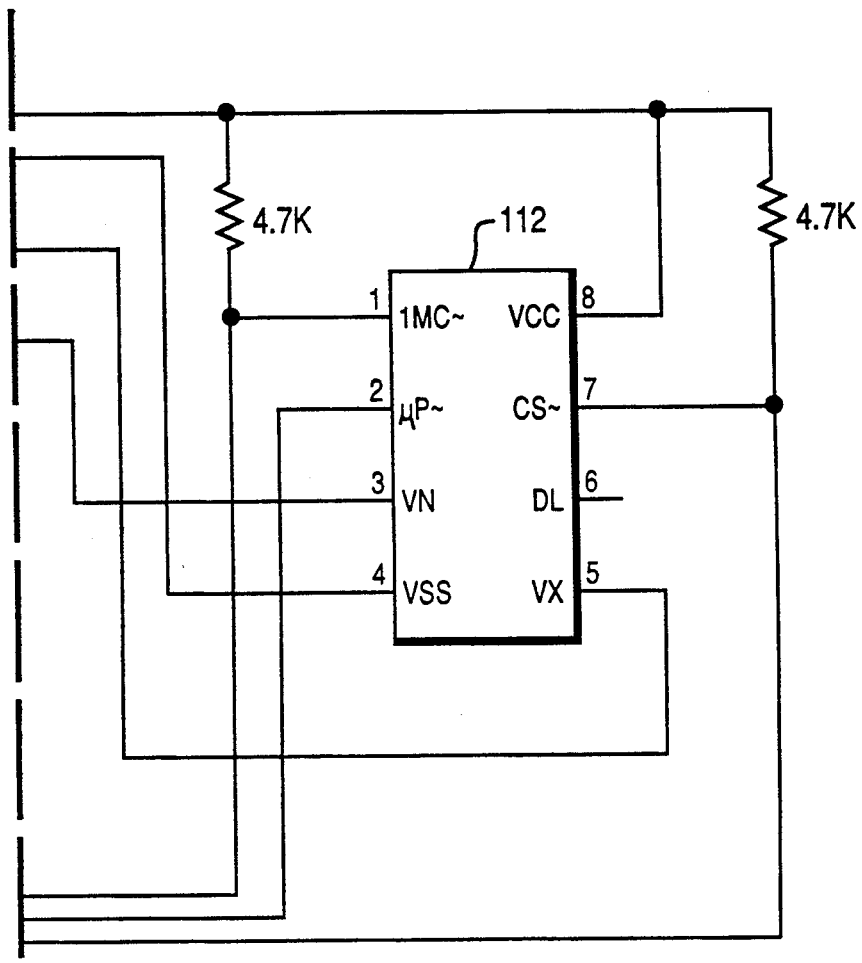
FIG. 11C
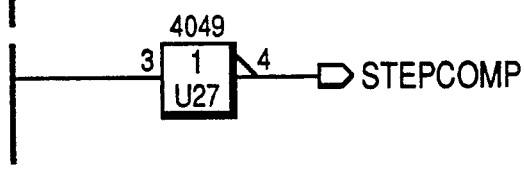
FIG. 11
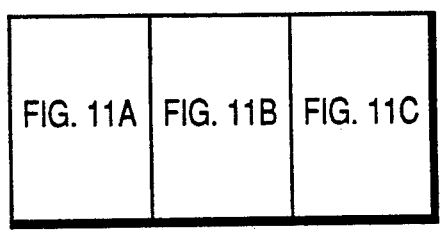

SYSTEM AND METHOD FOR REDUCING OSCILLATION OF A STEPPER MOTOR

BACKGROUND OF THE INVENTION

This invention relates to stepper motors generally, and particularly to the use of such motors in the accurate positioning (placement) of objects such as documents for printing.

In many document transport) and encoding (printing) systems, the document is stepped to successive character positions, and different characters are printed thereon in rapid succession. To ensure accurate placement of the document and rapid printing of the characters, the document must be transported with a minimum amount of time between characters, and the motor must achieve minimum ringing (oscillation) when the document is positioned at a location for printing. Variations in load, and in motors and motor driver circuitry, affect document positioning and linear placement of characters on the document.

Inaccuracies in positioning due to ringing may be introduced at time of manufacture of the transport system, and may not be detected because of lack of adequate calibration. Such inaccuracies also tend to increase with increase in use of the transport system.

What is needed and would be useful therefore is a system which could detect motor oscillations (ringing) either at the time of manufacture of the transport system or during subsequent use of the transport system, and could provide for reduction of such motor oscillations.

SUMMARY OF THE INVENTION

To meet such a need, a damping system and method are provided for reducing oscillations of stepper motors employed in such transport systems Preferred embodiments of the damping system (invention) are disclosed.

According to one aspect of the invention, an oscillation indicator is provided for use with a manually adjustable potentiometer, the stepper motor being responsive to varying resistances of the potentiometer. The system comprises:

an oscillation indicator coupled to the motor for providing an indication of oscillation of the motor during execution of a step in response to an applied step pulse of predetermined duration, the indication being representative of a back electromotive force of the motor;

the potentiometer being manually adjustable for reducing the oscillation, the back electromotive force and the indication.

According to another aspect of the invention, a system is provided for use with a processor-adjustable potentiometer. The system comprises:

an oscillation controller coupled to the motor and to the potentiometer, and responsive to a back electromotive force of the motor for adjusting the potentiometer, thereby reducing the oscillation and the back electromotive force.

According to a further aspect of the invention, a method is disclosed for reducing oscillation of a stepper motor, the motor being responsive to varying resistances of a potentiometer. The method comprises the steps of:

producing an indication of the oscillation of the motor, the indication being representative of a back electromotive force of the motor, and adjusting the potentiometer to a selected resistance level for reducing the indication and the oscillation.

BRIEF DESCRIPTION OF THE DRAWINGS

FIGS. 11, 11A, 11B and 11C comprise a circuit diagram showing the stepper controller of FIG. 10 in greater detail.

DESCRIPTION OF THE PREFERRED EMBODIMENT

Figure 1:
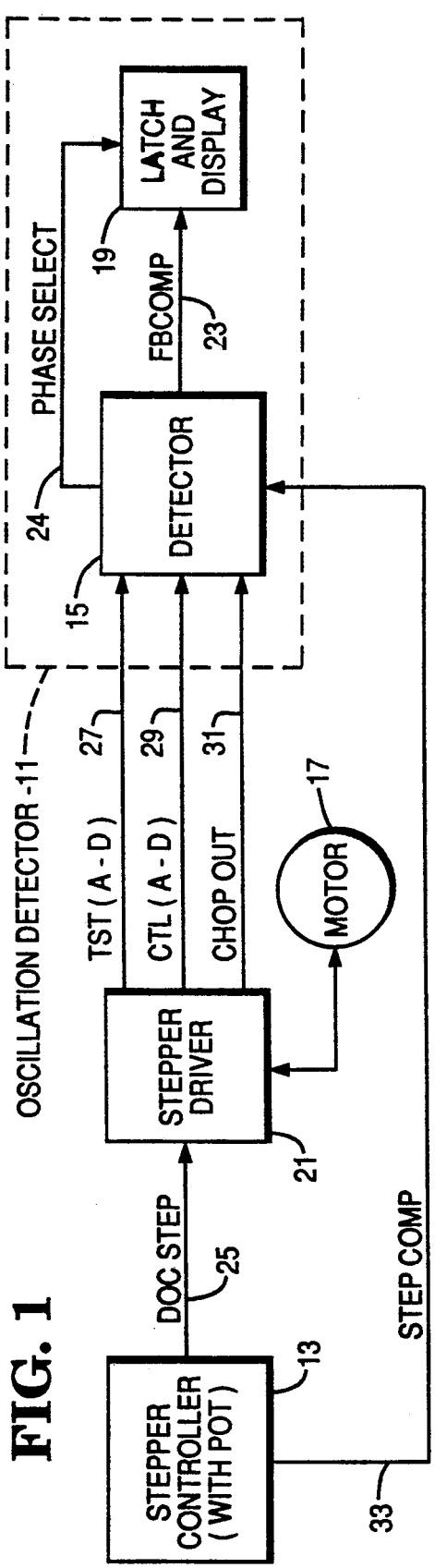
FIG. 1 is a block diagram of the system of the present invention including an oscillation indicator circuit for representing (e.g., displaying or otherwise indicating) oscillations of a stepper motor.

FIG. 1 shows a system of the present invention. The system is usable, for example, in an open loop mode in a stepper motor document-transport device or other such device for accurate incremental positioning of an object (e.g., positioning of a document for printing). Accurate positioning is achieved by improving the settling of the motor at a selected (final) position. The system includes an oscillation indicator circuit 11 for indicating the extent of stepper motor oscillations (ringing). The stepper motor device may include a stepper motor controller circuit 13 with a potentiometer for varying (reducing) the oscillations.

Oscillation indicator circuit 11 includes a detector circuit 15, and a latch and display circuit 19. Detector circuit 15 detects oscillations of stepper motor 17 by detecting the back electromotive force (BEMF) generated by the stepper motor at completion of a step (e.g., at completion of the last step of a twelve-step rotary motion). Latch and display circuit 19 produces an indication (e g., a display) of the peak mechanical oscillation (peak BEMF of the stepper motor 17) detected by circuit 15. The stepper motor device also includes a stepper driver circuit 21. Motor 17 is driven by the driver circuit 21 under control of stepper controller circuit 13.

Following the detection and display of oscillations that occur during a step operation (e g., during the last step), a user may reduce unwanted oscillations by varying (adjusting) the resistance of a potentiometer, thereby varying the duration of the voltage associated with the step. (The voltage is applied by controller 13 to motor 17 via driver 21). This adjustment may be accomplished by manually varying the potentiometer 12 (FIG. 3) of the controller 13 while monitoring the output from the display 19, and repeating the step operation until the BEMF is reduced (minimized), i.e., until the output signal (FBCOMP) 23 is optimally damped and the oscillations are reduced or otherwise eliminated.

Figure 2A:
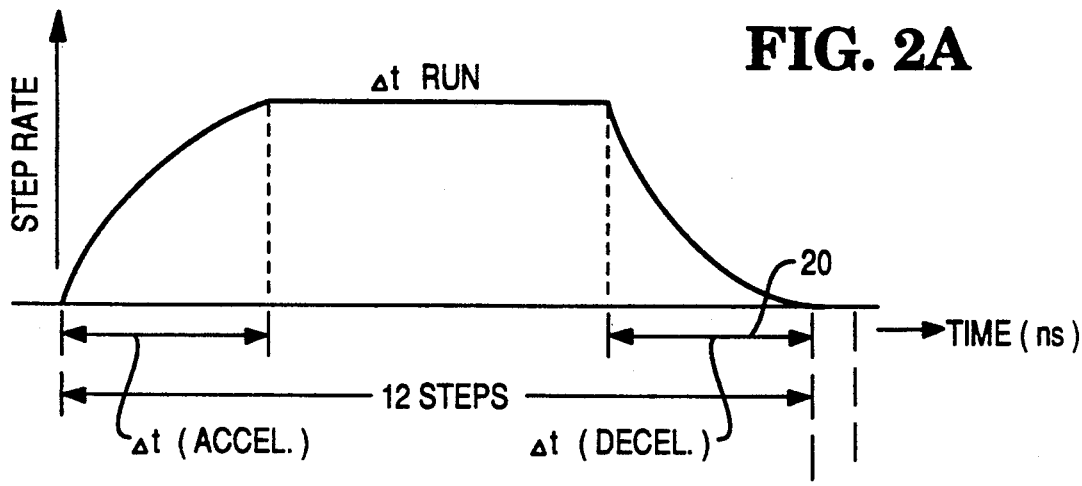
FIG. 2A is a waveform diagram showing a velocity profile of the stepper motor in producing an undamped oscillation.

As shown in FIG. 1, the stepper motor 17 is used in an open loop mode, having a predetermined velocity profile (FIGS. 2A, 2B, and 2C, hereinafter referred to as FIG. 2) with a variable last step. The motor 17 is started, accelerated, maintained at a constant velocity (step rate), decelerated, and stopped (i.e., stopped by a cessation of applied pulses, and settled with some occurrence of ringing) within fifteen milliseconds. This velocity profile provides a linear increment between characters of, for example, 0.1" for OCR (optical character recognition) and 0.125" for MICR (magnetic ink character recognition).

Figure 2B:
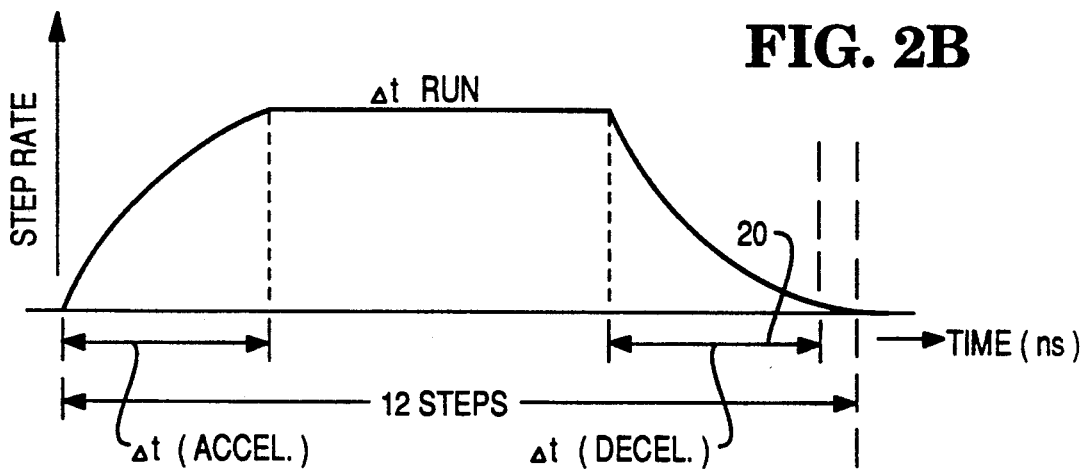
FIGS. 2B and 2C are waveform diagrams showing velocity profiles of the stepper motor in producing a damped oscillation.
Figure 2C:
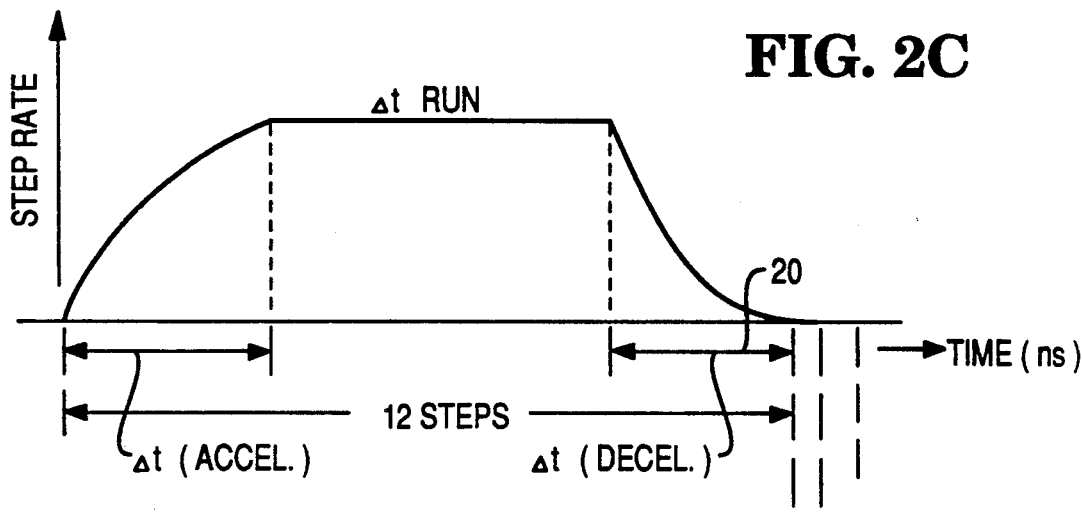
Figure 3A:
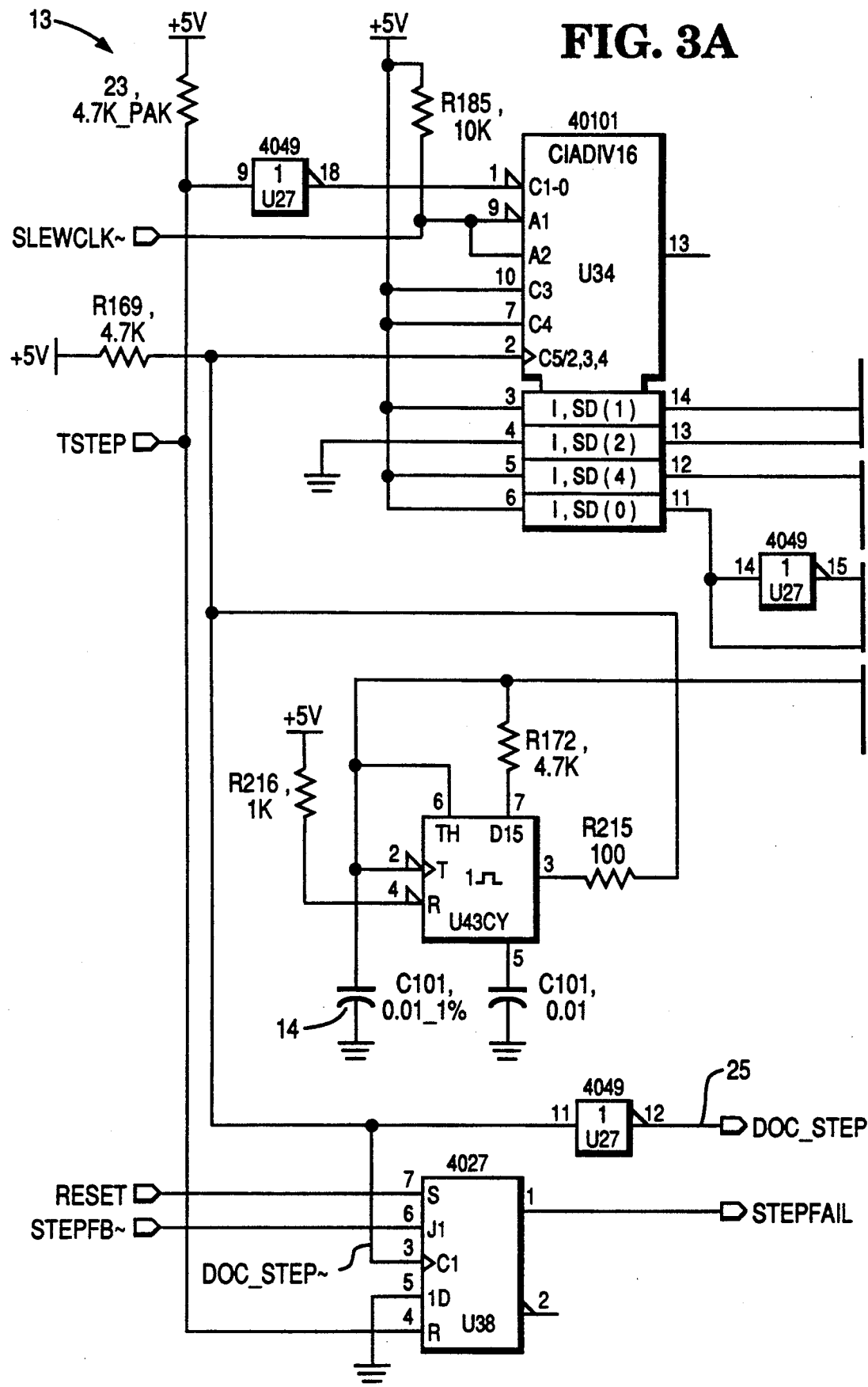
FIGS. 3A and 3B is a circuit diagram of a stepper controller for controlling the stepper motor of FIG. 1.
Figure 3B:
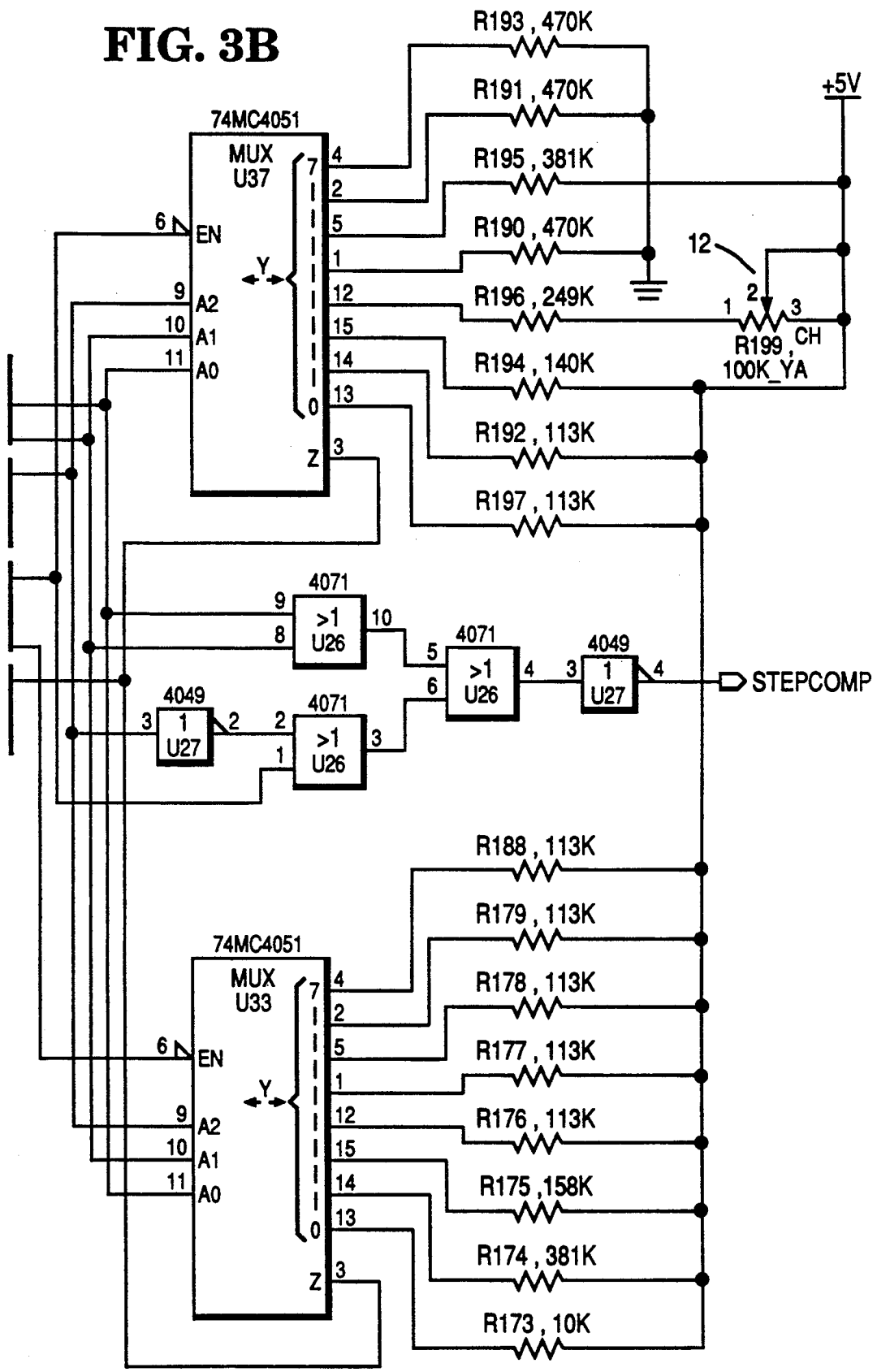

As shown in FIGS. 1, 3A and 3B, successive step pulses 25 (e.g., twelve 5-volt document step pulses per move, corresponding to the velocity profile in FIG. 2) are applied by controller 13 to stepper driver circuit 21 to drive motor 17. The BEMF signal (TST) 27 produced at each phase (A, B, C, D) of rotation of the motor is applied by driver circuit 21 to detector circuit 15. Also applied to circuit 15 are control signals CTL (A-D) 29 which identify the active phase of the motor and, hence, the phase of the associated BEMF signal.

Figure 4:
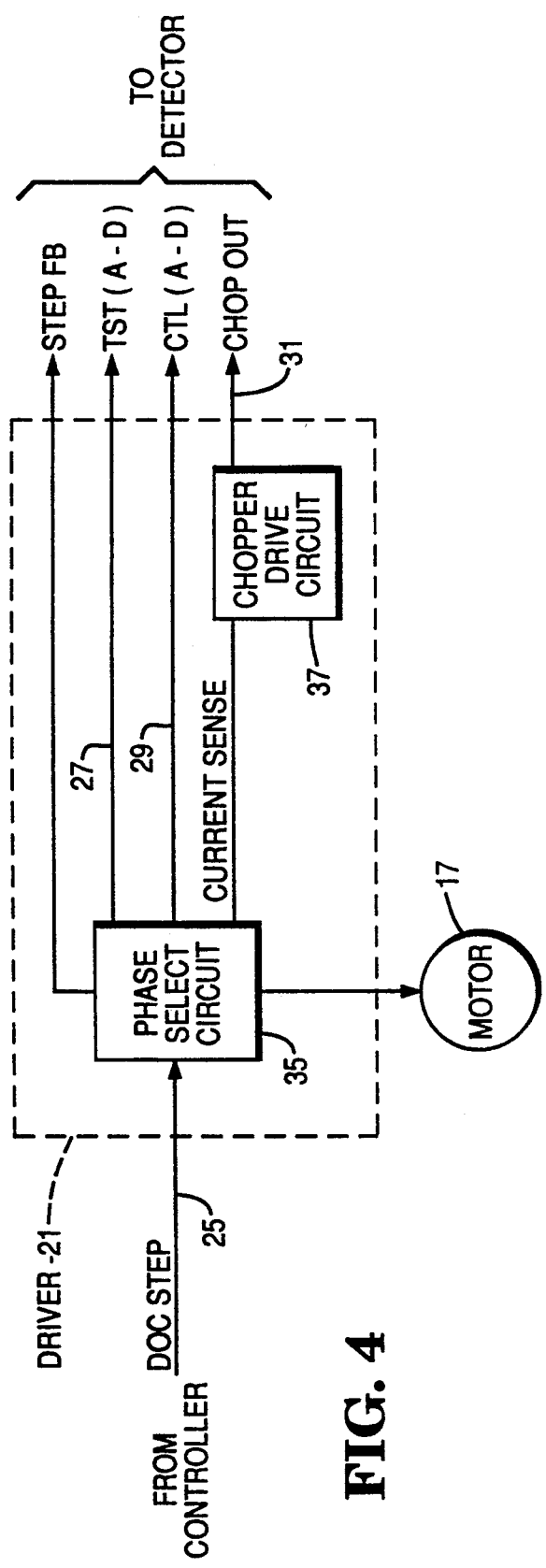
FIG. 4 is a block diagram of a stepper driver, with a phase select circuit and a chopper drive circuit for driving the stepper motor of FIG. 1.

As shown in FIG. 4, driver circuit 21 comprises a phase select circuit 35 and a chopper drive circuit 37. Phase select circuit 35 is shown in greater detail in FIGS. 5, 5A, 5C, and 5D, hereinafter referred to as FIG. 5, and chopper drive circuit 37 is shown in greater detail in FIGS. 6A and 6B, hereinafter referred to as FIG. 6. As shown in FIGS. 1, 4, 5, and 6, the TST signals 27 represent phased BEMF signals from the windings (not shown) of stepper motor 17. The CTL signals 29 represent the phases (A, B, C, or D) of the BEMF signal, i.e., the phase present at the time of the particular motor step (e.g , at the time of the last step). The CHOP OUTPUT signal 31 from the chopper drive circuit 37 is used by detector 15 to initiate sampling of the BEMF signal during the off state of the chopper drive circuit 37, as described below.

Figures 5, 5A:
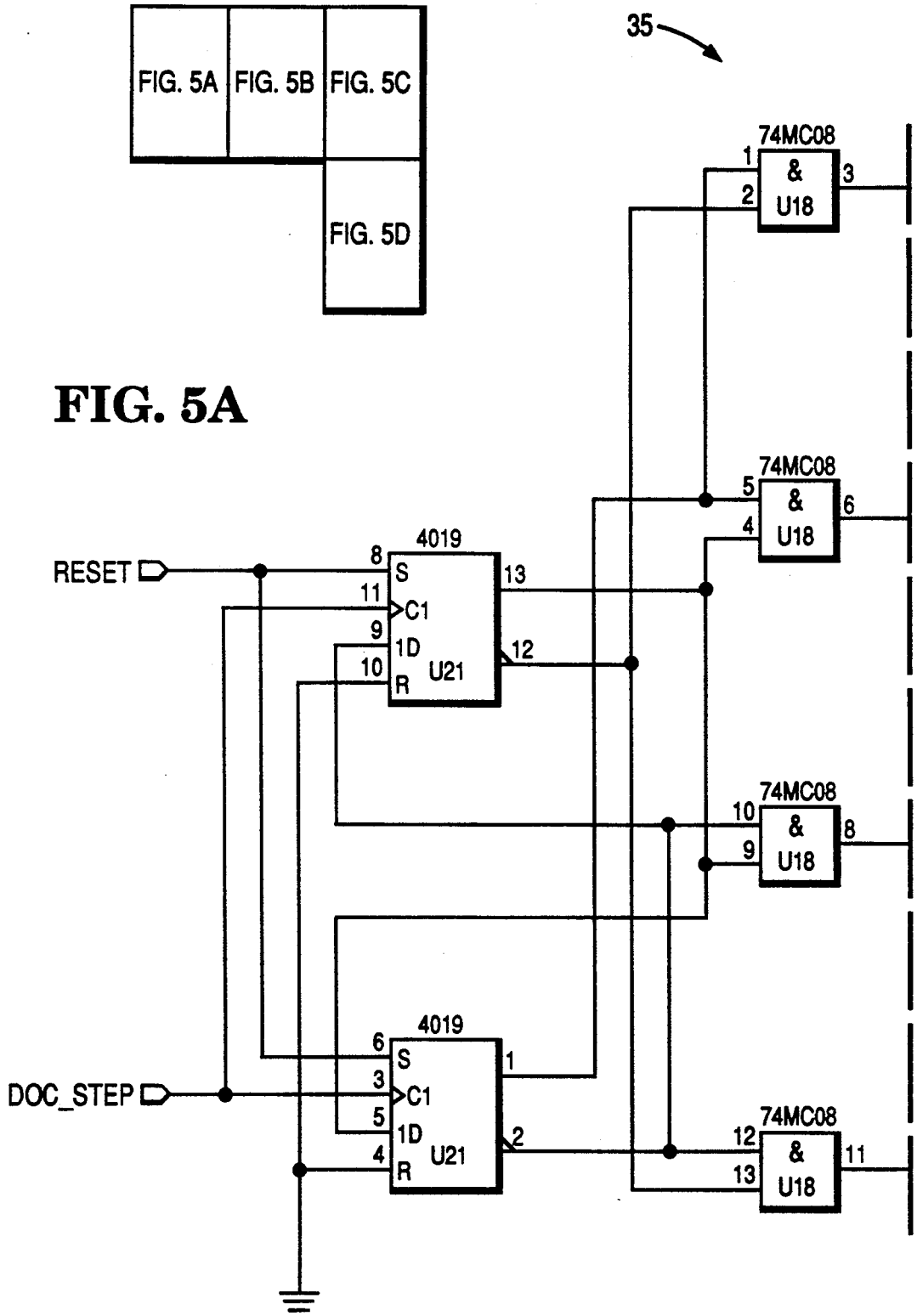
FIGS. 5, 5A, 5B, 5C and 5D is a circuit diagram showing the phase select circuit of FIG. 4 in greater detail.
Figure 5B:
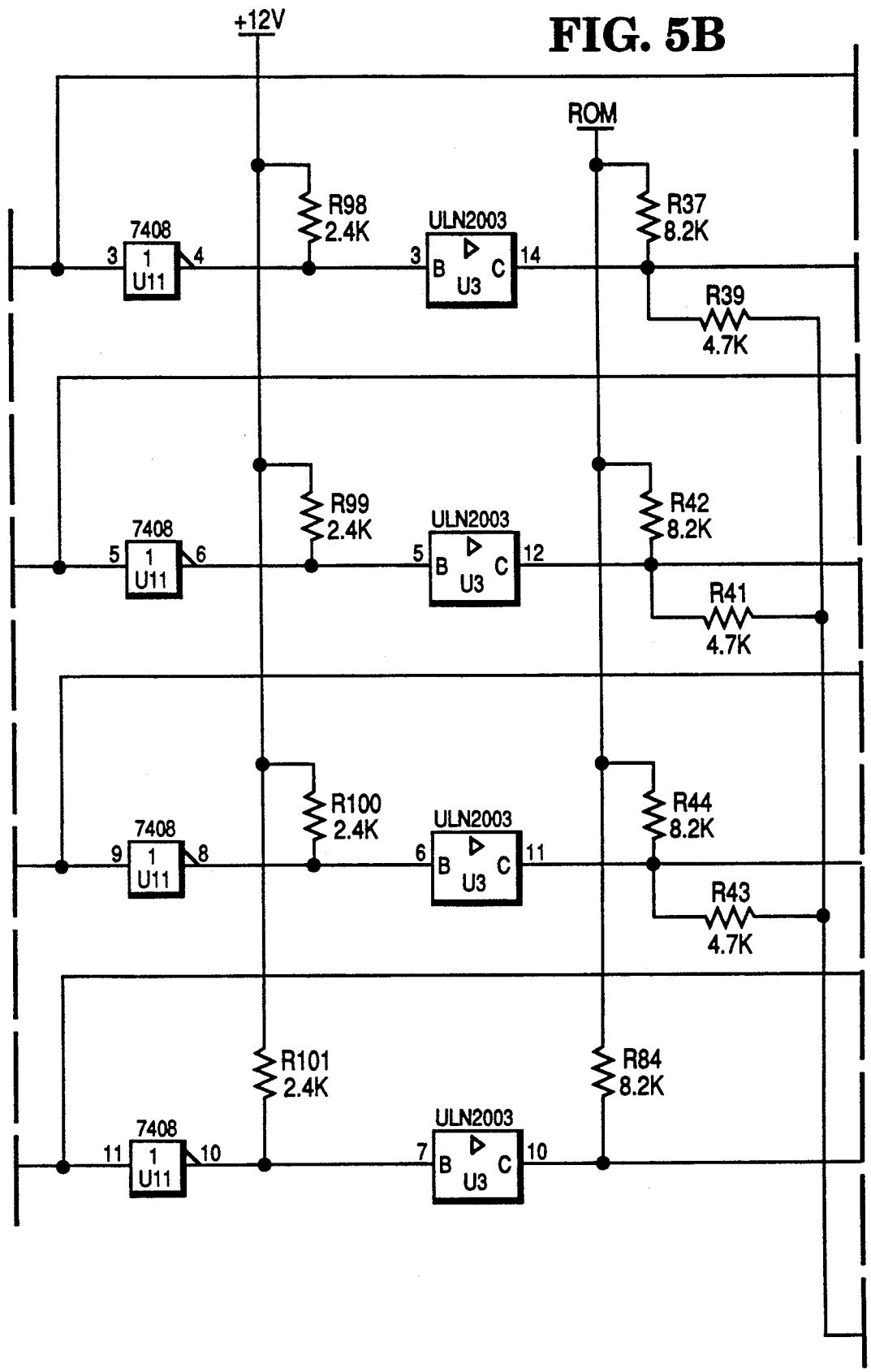
Figure 5C:
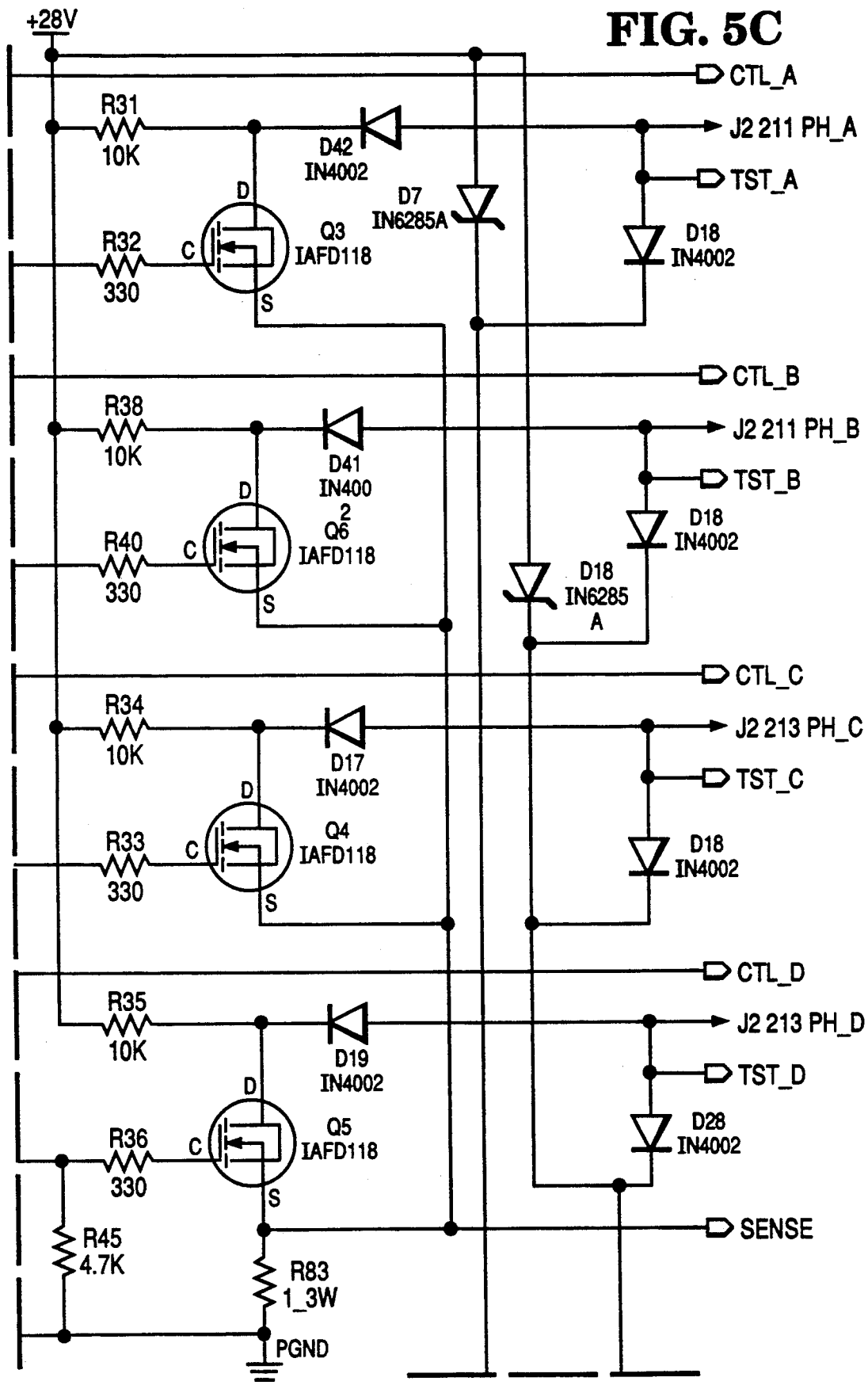
Figure 5D:
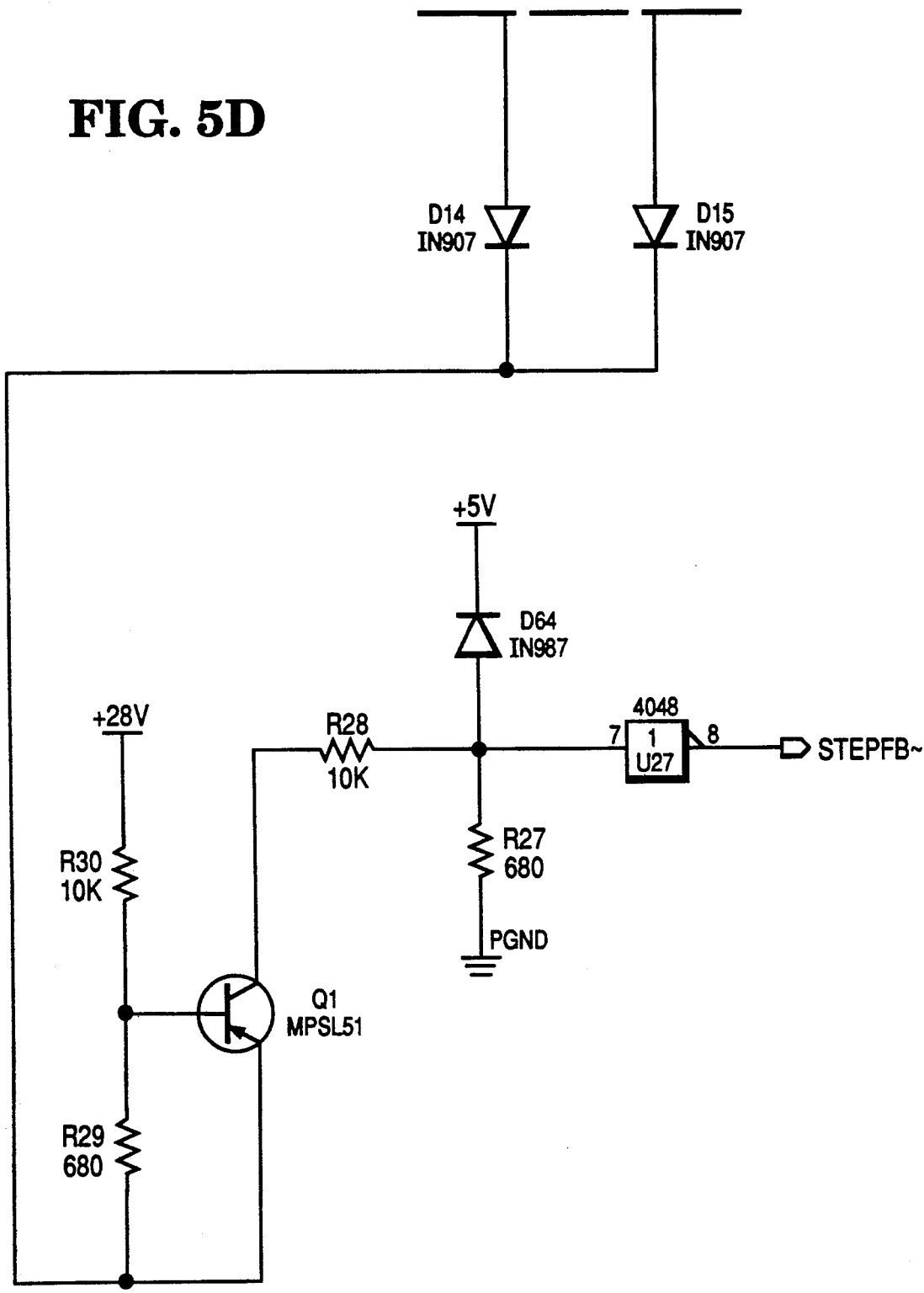
Figure 6A:
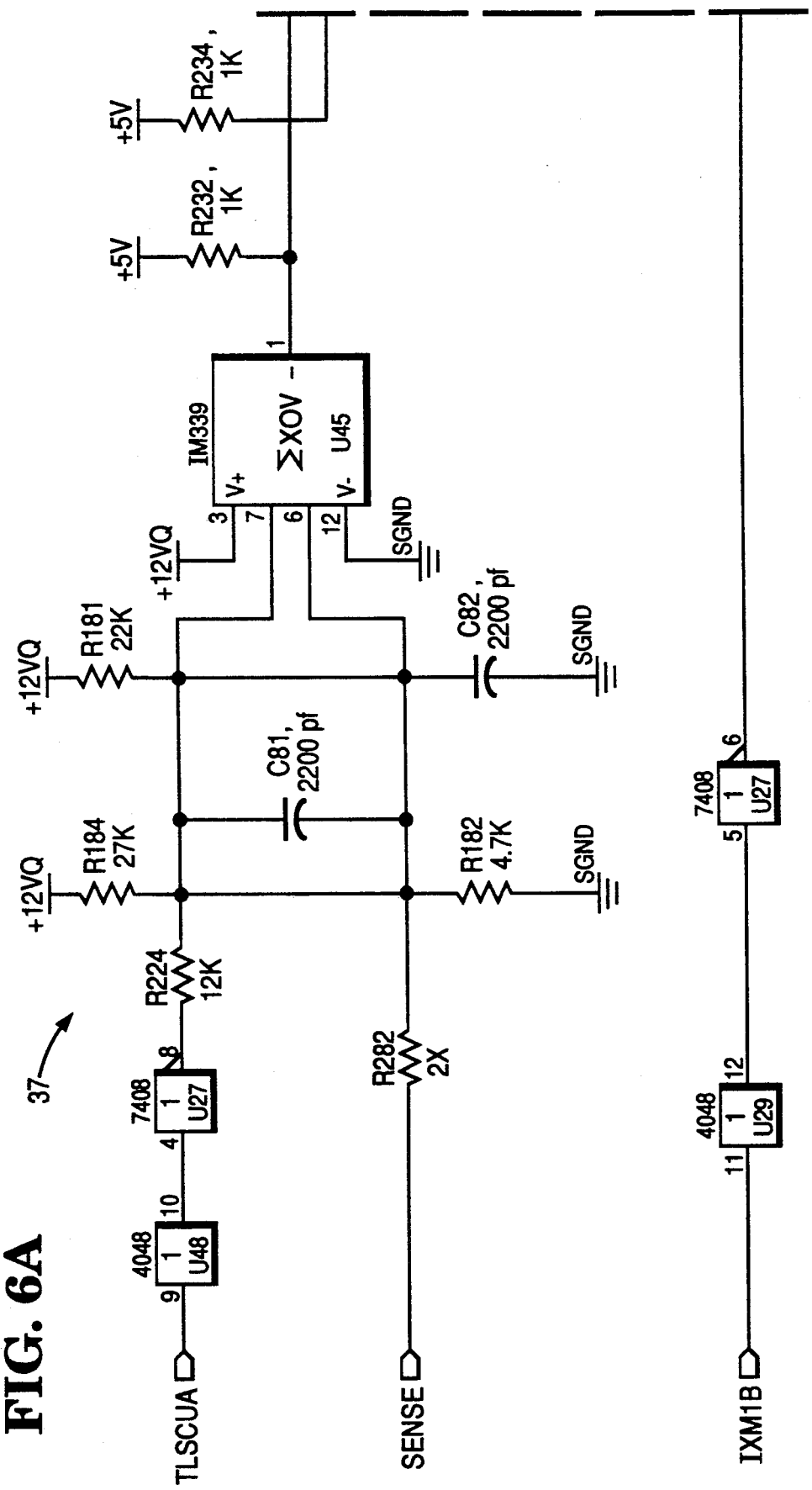
FIGS. 6A and 6B comprise is a circuit diagram showing the chopper drive circuit of FIG. 4 in greater detail.
Figure 6B:
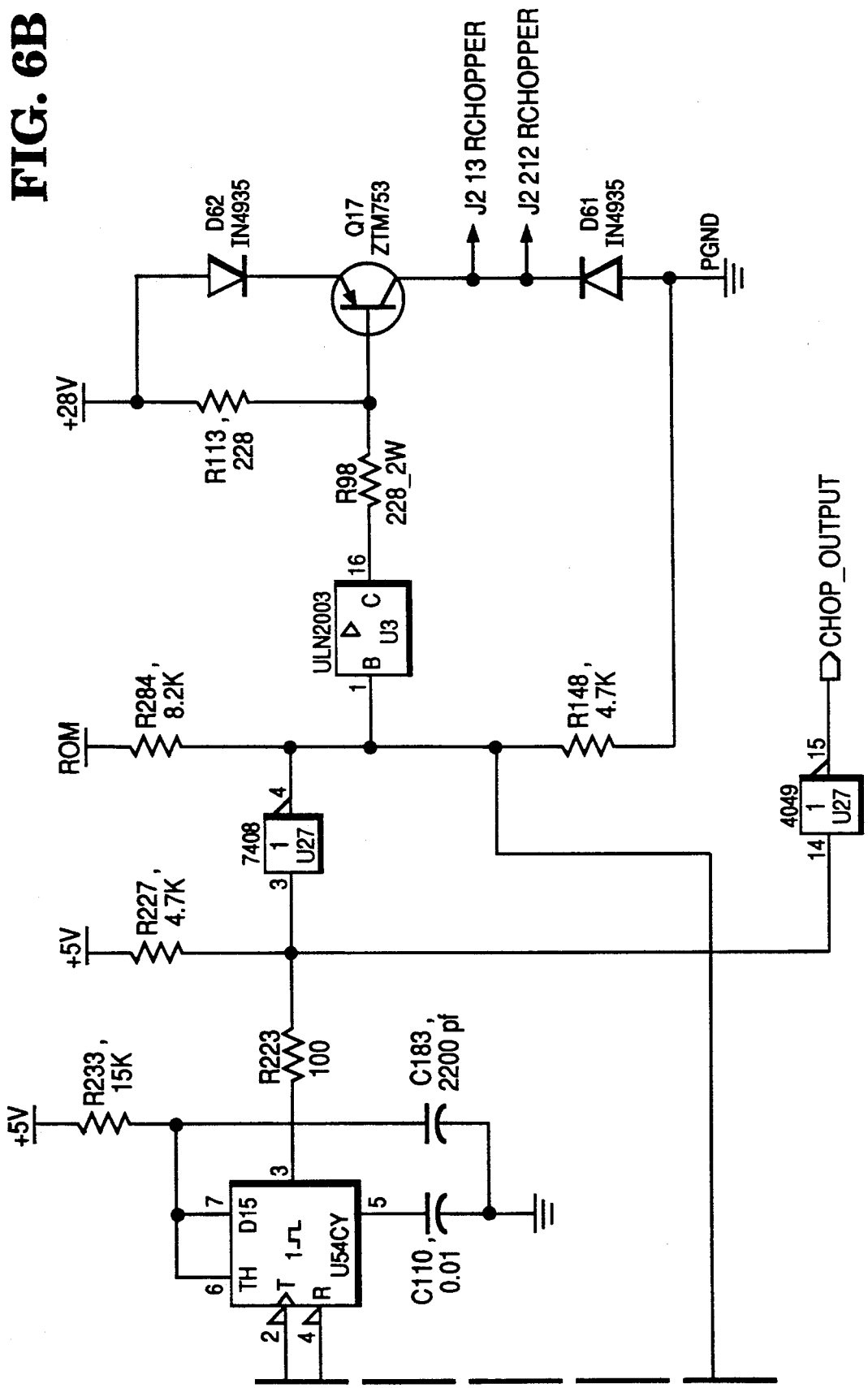

Detector 15 shown in FIG. 1 and FIGS. 7, 7A, 7B, and 7C (hereinafter referred to as FIG. 7) detects the voltage (or current) of the BEMF signal (e.g., signal TST-A, TST-B, TST-C, or TST-D) generated by the unipolar windings of the stepper DM May 28, 1991 motor 17 when the motor is oscillating in the last step position. (Generally, the magnitude and detection location of the BEMF signal will vary depending on the type of stepper motor and driver circuitry used.) A typical chopper driver circuit and phase selection circuit are shown in FIGS. 4–6. The BEMF signal is detected, during the off stage of the chopper cycle, on the drain of HexFETs Q3, Q6, Q4, Q5. In such a single phase drive circuit, the BEMF signal may be found on the opposite coil, i.e., the coil associated with the currently selected phase of the stepper motor (e.g , phase CTL-B for BEMF signal TST-B).

Figures 7, 7A:
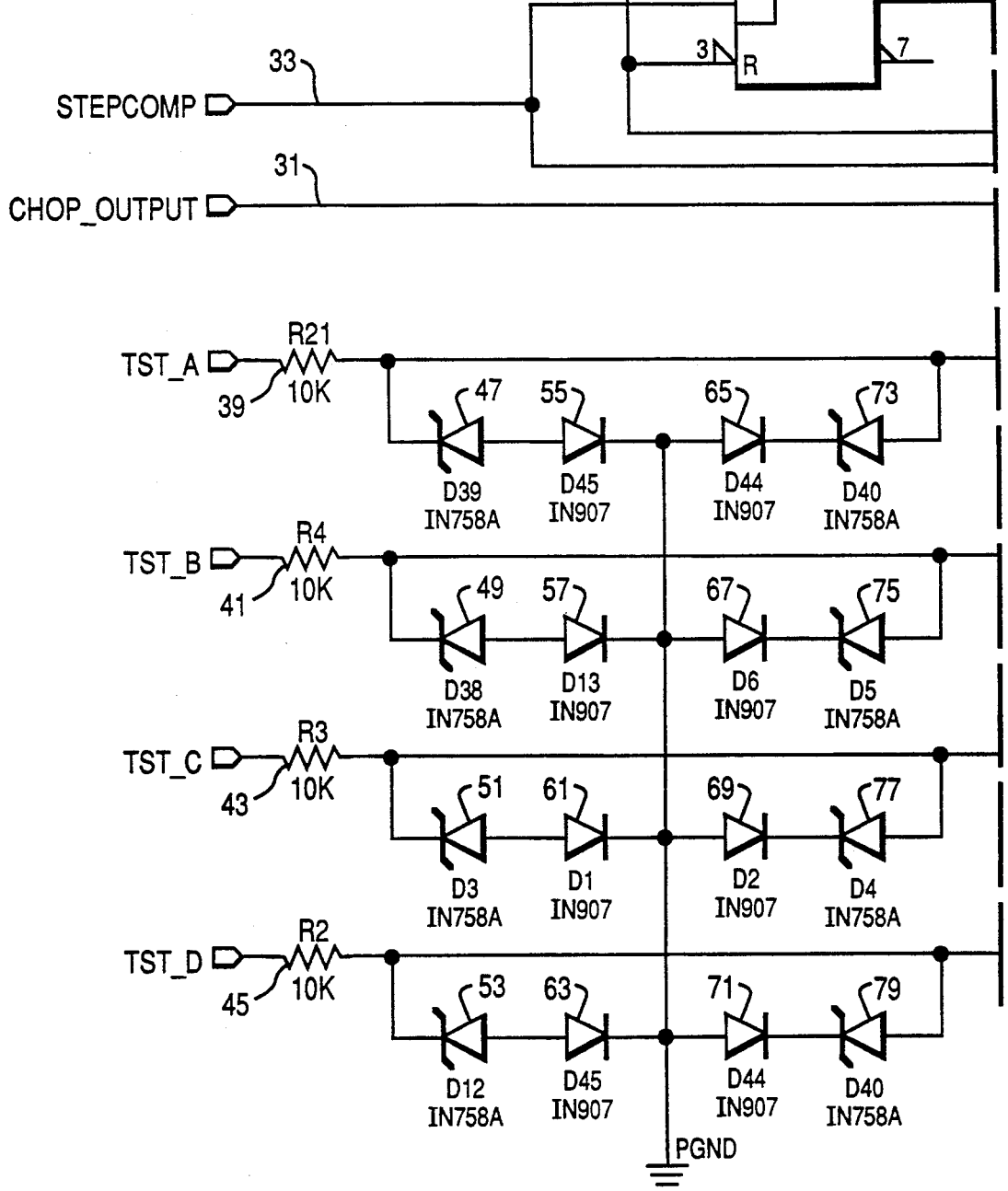
FIGS. 7, 7A, 7B, and 7C comprise is a circuit diagram representing a detector circuit included in the oscillation indicator circuit of FIG. 1.
Figure 7B:
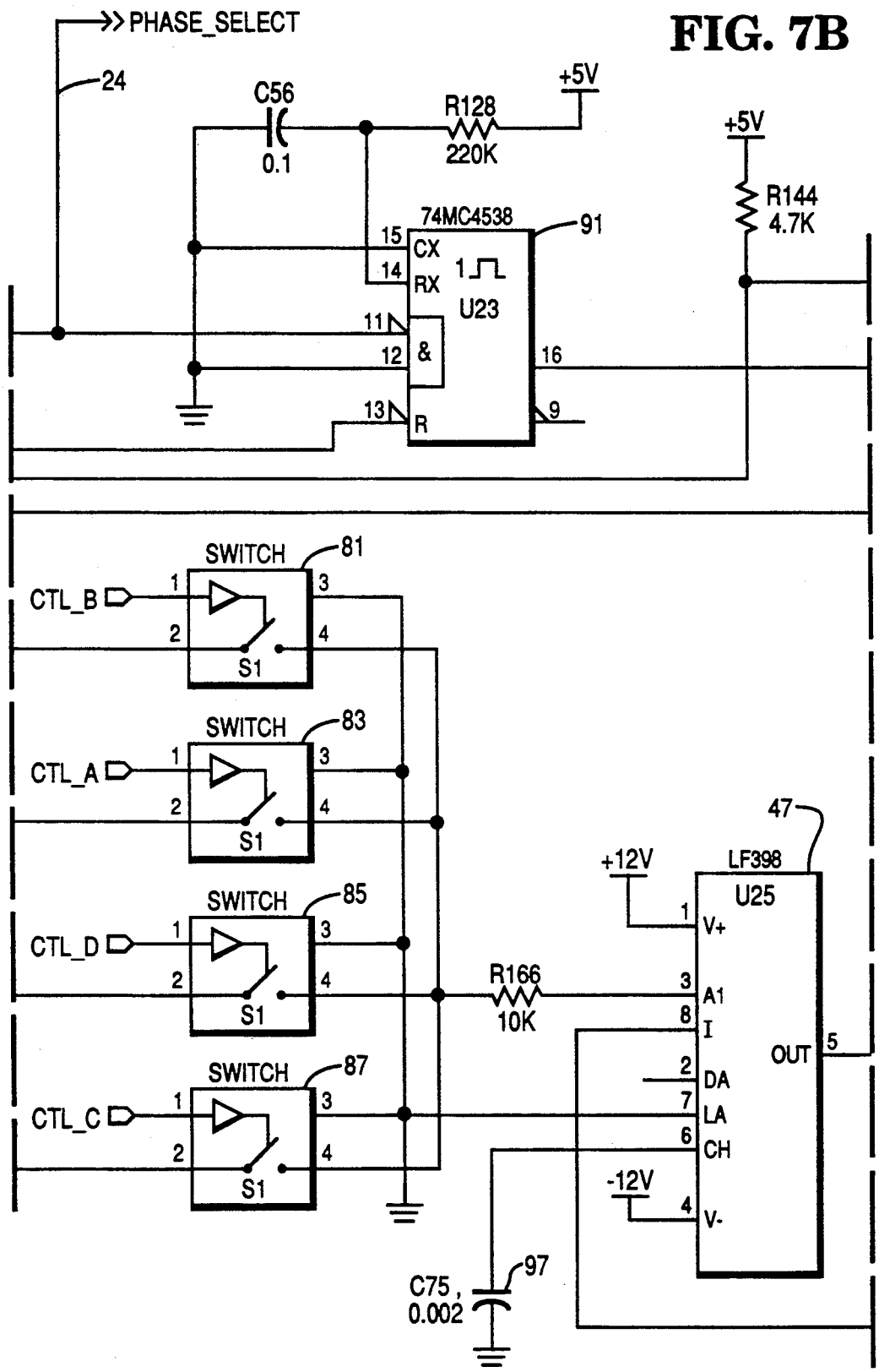
Figure 7C:
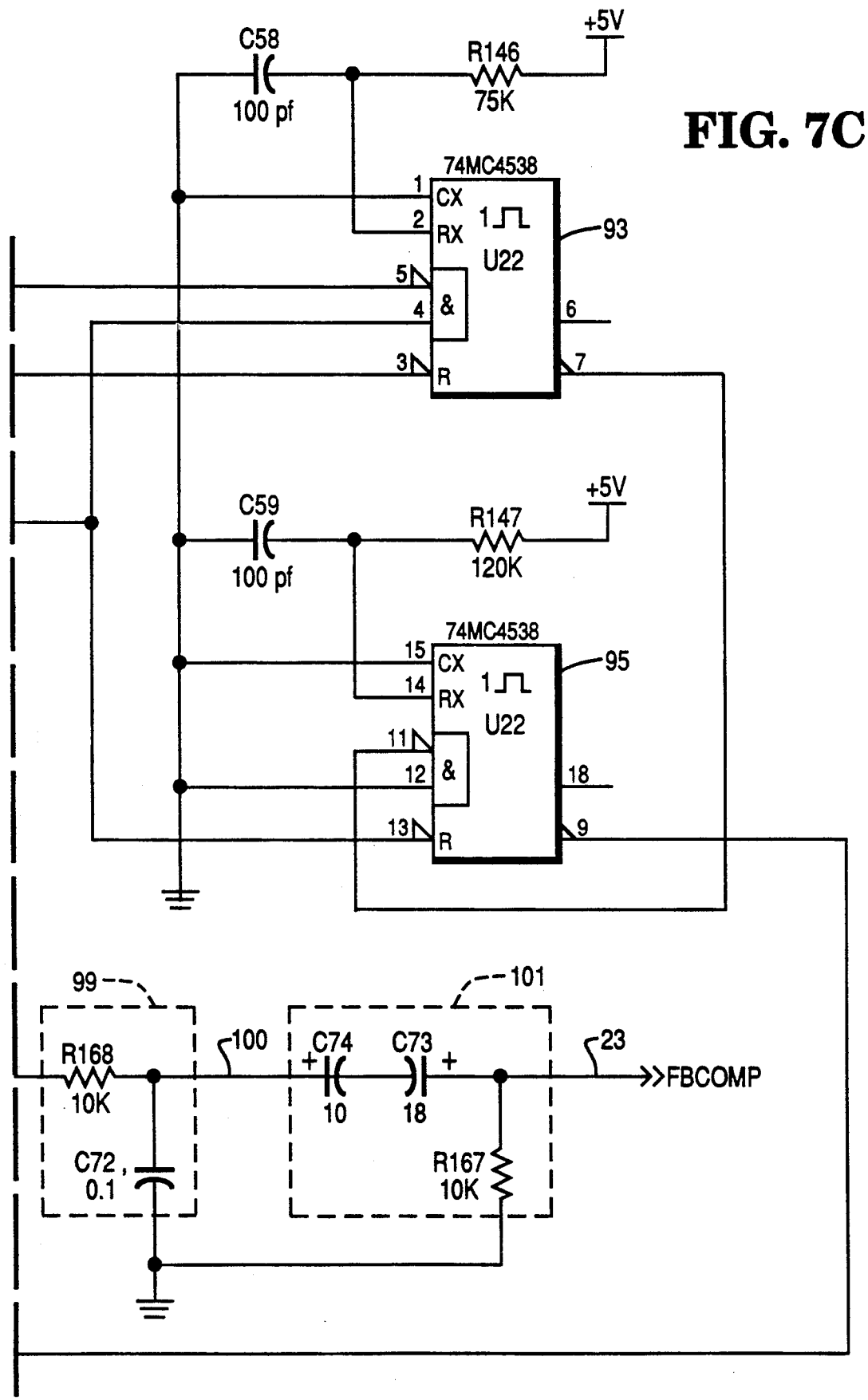

As shown in FIG. 7, in response to the signals CHOP OUTPUT 31 from the chopper driver circuit 37 and STEP COMP 33 from controller 13, the detector 15 detects the applied BEMF signal (TST) and associated phase signal (CTL) from motor 17, and produces a FBCOMP signal 23 (representing a sample of the applied BEMF signal) and a PHASE SELECT signal 24. The STEP COMP signal 33 is used to indicate when the rotor (not shown) of the stepper motor 17 is positioned at a selected step (e.g., at the last step of a multi-step motion, such as the twelve step motion shown in FIG. 2) The PHASE SELECT signal 24 is used to reset latch circuit 19 shown in FIG. 1 and FIGS. 8, 8A, 8B, and 8C (hereinafter referred to as FIG. 8) when the stepper motor 17 reaches the last step position and before the BEMF is sampled by sampler 47. The FBCOMP signal 23 represents the sampled BEMF signal.

Figure 9A:
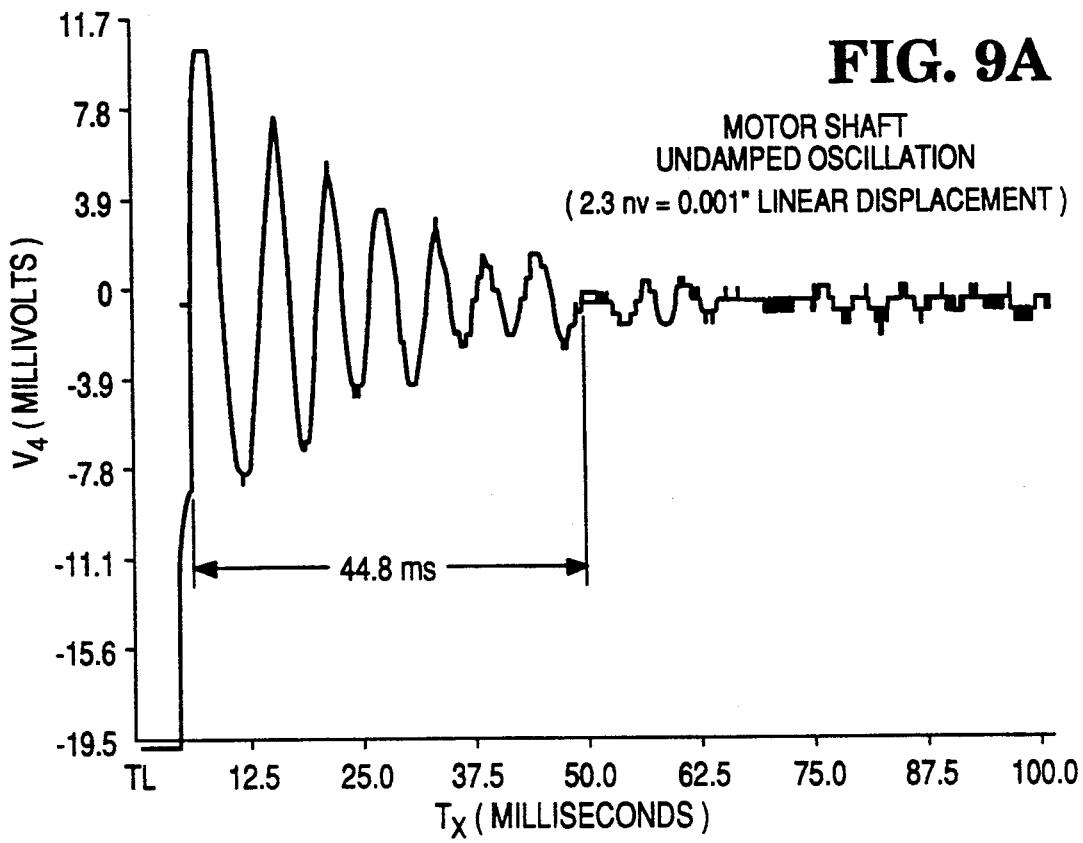
FIG. 9A is a waveform diagram showing undamped oscillations of the stepper motor corresponding to the velocity profile of FIG. 2A.
Figure 9B:
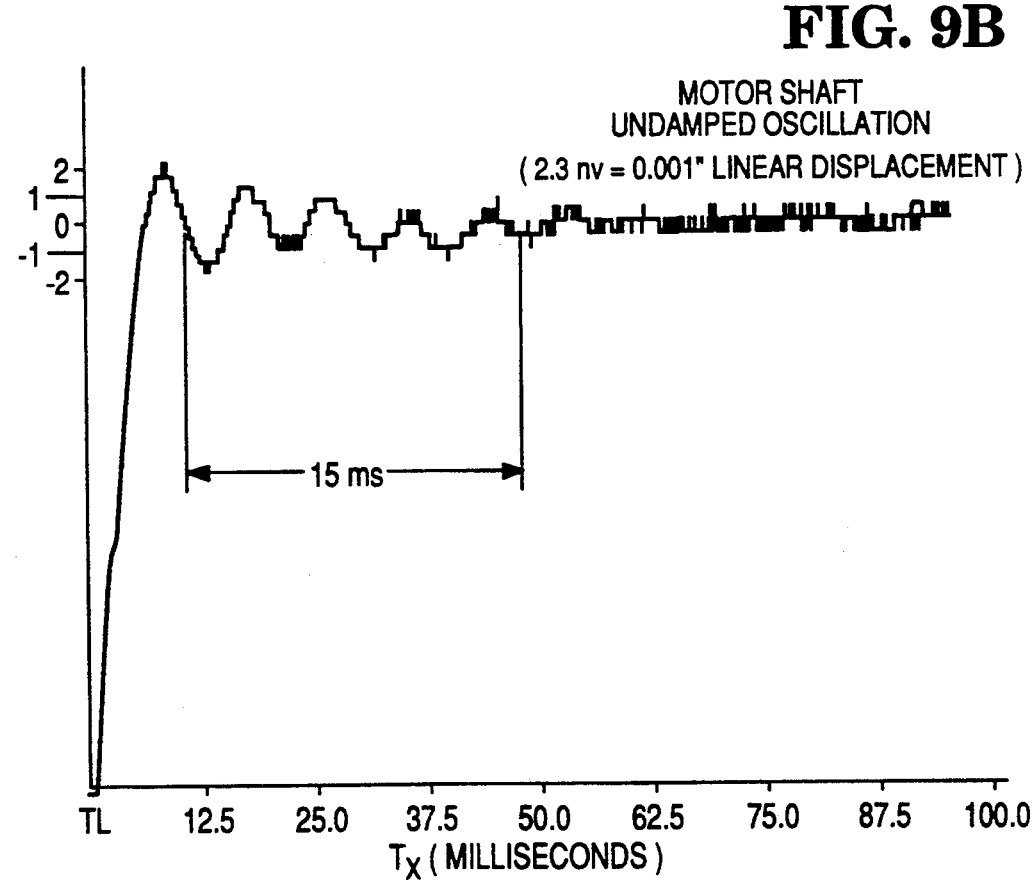
FIG. 9B is a waveform diagram showing damped oscillations of the stepper motor corresponding to the velocity profile of FIG. 2B or FIG. 2C.

To ensure proper operation of detector circuit 15 (FIG. 7), the current and voltage of the BEMF signal are limited. The current is limited by current limiting resistors 39–45. The voltage is limited by zener diodes 47–53 and signal diodes 55–63 to +12 volts maximum input, and limited by signal diodes 65–71 and zener diodes 73–79 to a −12 volts maximum input on analog switches 81–87. Because the phase at which the stepper motor stops may vary at any given time, switches 81-87 are used to select the appropriate phase associated with the BEMF signal. Sample and hold circuit 47 samples the BEMF signal during the off state of the CHOP OUTPUT signal, and holds the sampled signal until the off state of the next CHOP OUTPUT signal. As a result of this sampling operation, an output waveform (FBCOMP, as shown in FIGS. 9A and 9B) is produced which represents the stepper motor oscillations when it has stopped, following completion of a multi-step move. Delay circuit 89 delays the last step signal (STEP COMP) by approximately 1.2 ms to allow the current to rise to a regulated level and the chopper driver circuit 37 to start operating and produce a CHOP OUTPUT signal for input to detector 15. Companion circuit 91 produces a time window (via delay circuits 93, 95) for the sample and hold circuit 47 to detect the BEMF signal. The time window is limited to 20 ms corresponding to the width of the STEP COMP signal 33 (the width representing the dwell time of the motor in the last step position). The CHOP OUTPUT signal 31 is applied to delay circuits (monostable multivibrators) 93, 95 which produce an approximately 6.8 $\mu$s delay in the signal. This delay ensures that when the BEMF signal is applied to the sample and hold circuit 47, it is flat and appropriate for sampling with a pulse width of approximately 12 $\mu$s as defined by delay circuit 95. (The minimum time for operation of the sample and hold circuit 47 is, for example, 10 $\mu$s.). Capacitor 97 maintains the sample level between sample periods. The output of the sample and hold circuit 47 is passed through an integrator 99 and a level shifter 101, and clamped to ground (referenced to zero volts), before being applied as output signal FBCOMP 23 to latch and display circuit 19.

Figure 8:
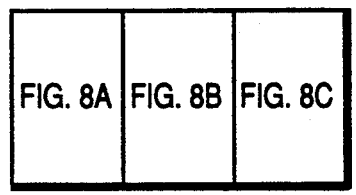
FIGS. 8, 8A, 8B and 8C comprise a circuit diagram representing a latch and display circuit included in the oscillation indicator circuit of FIG. 1.
Figure 8A:
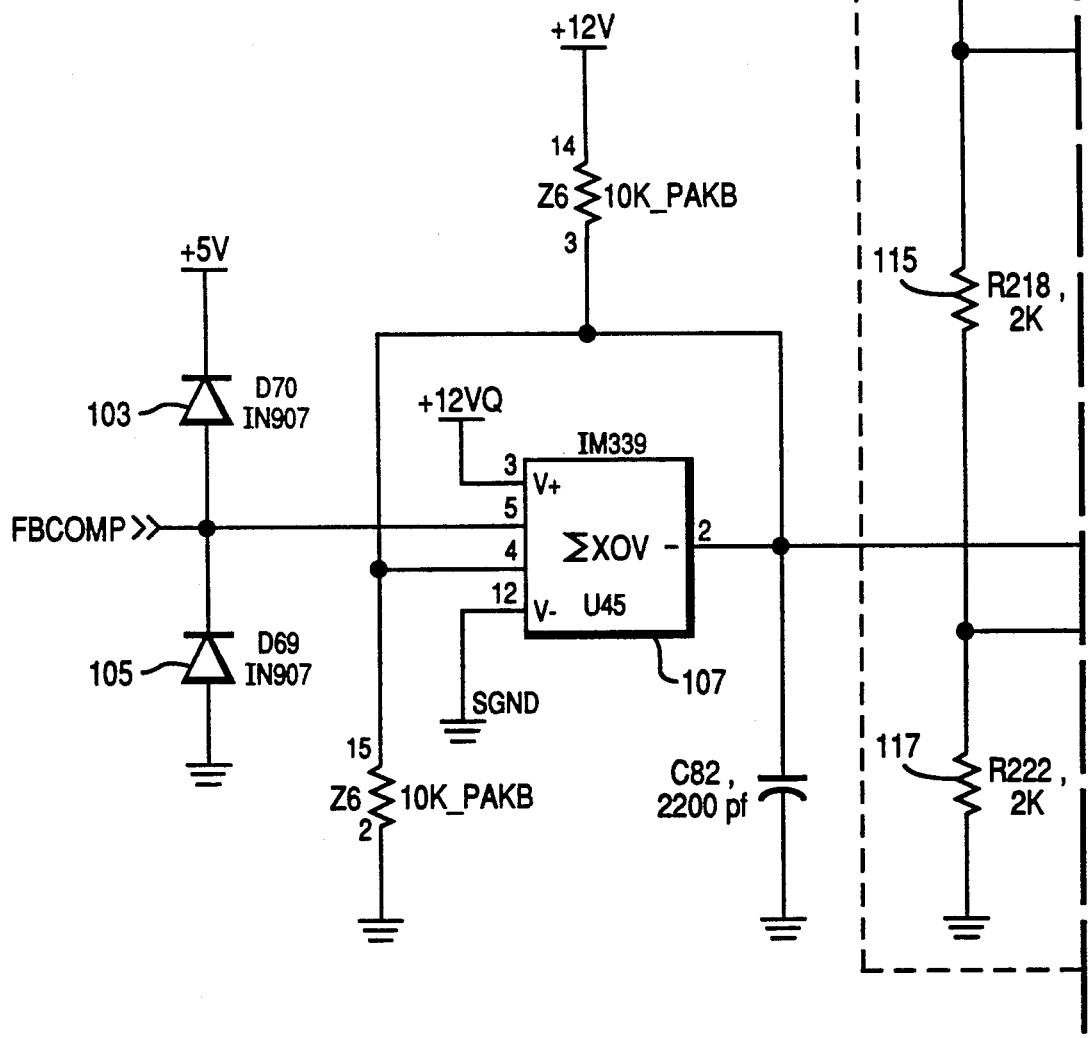
Figure 8B:
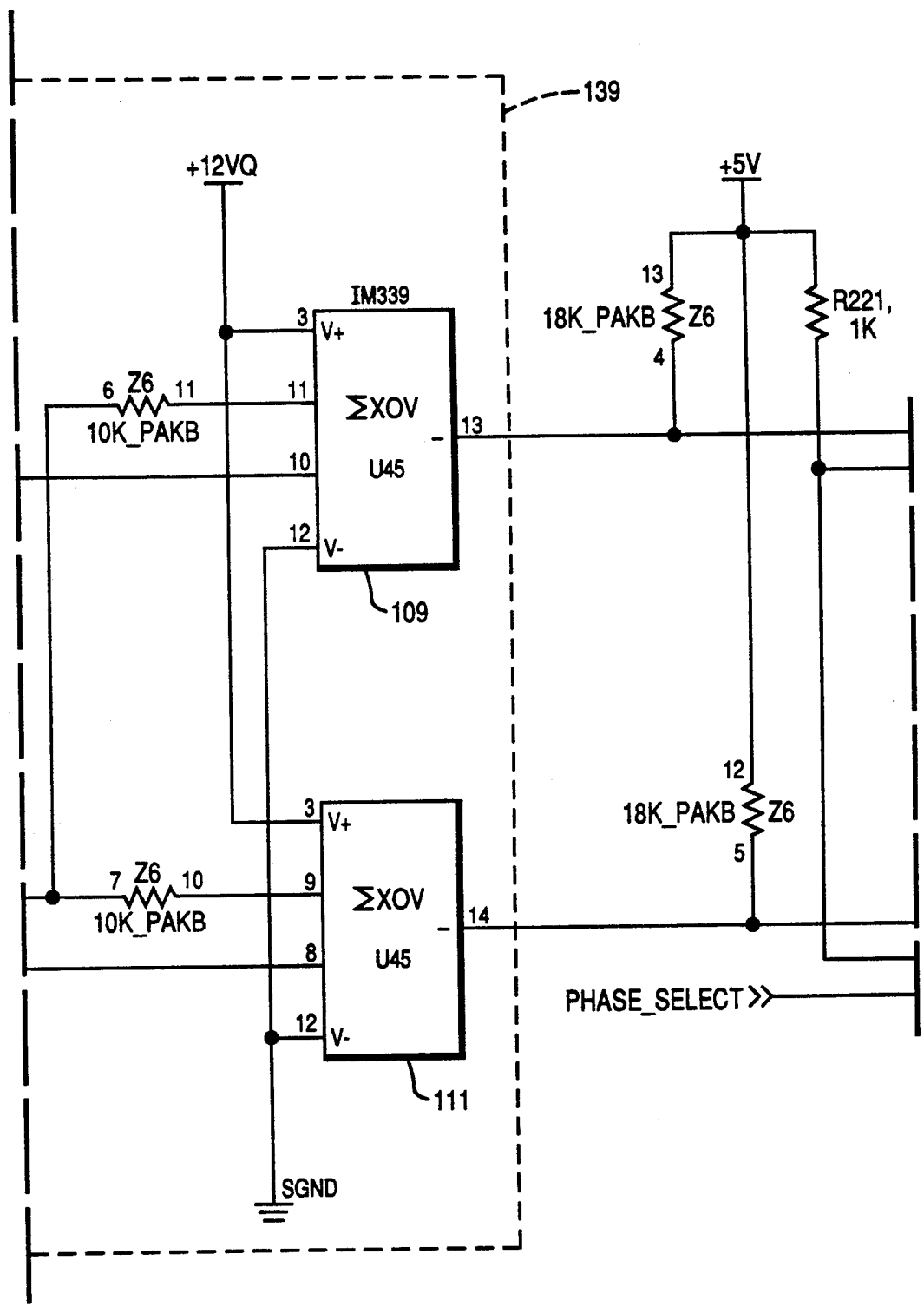
Figure 8C:
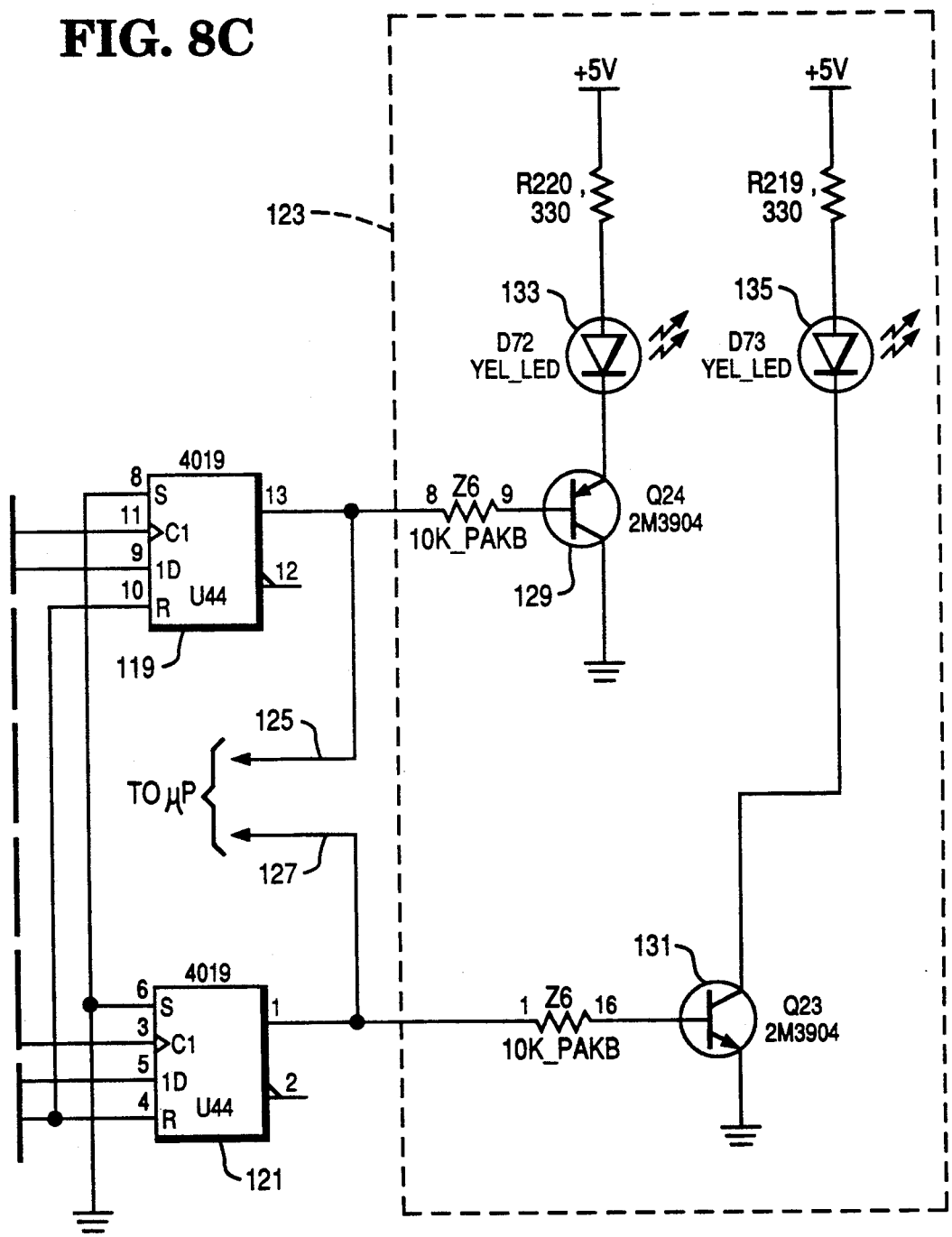

As shown in FIG. 8, the sampled BEMF signal (FBCOMP) is first limited to a range of from zero volts (ground) to +5 volts by diodes 103, 105 (which cuts off the negative transitions of the signal), then applied to buffer (unity gain amplifier) 107 for purposes of isolation. The output of buffer 107 is applied to level (peak) detectors 109, 111 of A/D (analog to digital) converter 139. Resistors 113, 115, 117 act as a voltage divider circuit for defining a voltage reference level for peak detection, i.e., for setting the voltage level to a desired reference level. (The desired reference level may be relative to the physical angular displacement of the rotor (not shown) of the stepper motor.) The peak output voltage signals from level detectors 109, 111 are applied to, and trigger, latches 119, 121. The peak voltage output signals from latches 119, 121 are then applied to display circuit 123. Alternatively, the peak output voltage signals may be applied via leads 125, 127 to a processor.

Display circuit 123 includes LED (light emitting diode) drivers 129, 131 and LEDs 133, 135. The peak voltage output signals from latches 119, 121 feed the two LED drivers 129, 131. When the positive peak of the BEMF signal exceeds the voltage level defined by reference resistor 117, LED driver 131 turns on LED 135. When the positive peak of the BEMF signal exceeds the voltage level defined by reference resistor 115, LED driver 129 turns on LED 133. The latches 119, 121 are reset by the PHASE SELECT SIGNAL each time the last step signal (STEP COMP) is generated (i.e., after the stepper motor reaches the last position, and before the BEMF is sampled). This is done to ensure that at each step of the stepper motor, a newly sampled BEMF signal is latched to the display 123 (or to the processor).

Upon viewing the oscillations displayed by LEDs 133, 135, the user manually adjusts potentiometer 12 (FIG. 3) to reduce or damp the oscillations. The oscillations occur after each move (rotation) of the stepper motor (i.e., after the last step of the move, each move being represented by a group of twelve steps corresponding to the velocity profile shown in FIG. 2A).

An example of an undamped oscillation (naturally decaying signal representing the physical response or mechanical motion of the motor) is presented in FIG. 9A. An example of a damped oscillation is presented in FIG. 9B. Pot 12 (FIG. 3) and capacitor 14 represent an RC time constant. When the potentiometer is adjusted and resistance is increased to an optimum level, the duration or duty cycle of the last step pulse is increased and the deceleration period 20 of the motor is increased accordingly, as shown in FIG. 2B, with consequent reduction in oscillations (ringing) of the motor following the last step. Alternatively, when the potentiometer is adjusted and resistance is decreased to an optimum level, the duration or duty cycle of the last step is decreased and the deceleration period 20 of the motor is decreased accordingly, as shown in FIG. 2C, again with consequent reduction in oscillations of the motor following the last step. Thus, either an increase or a decrease in resistance to an optimum level produces a reduction in oscillation. This reduction in oscillation can be seen in FIG. 9B, when compared to FIG. 9A.

Figure 10:
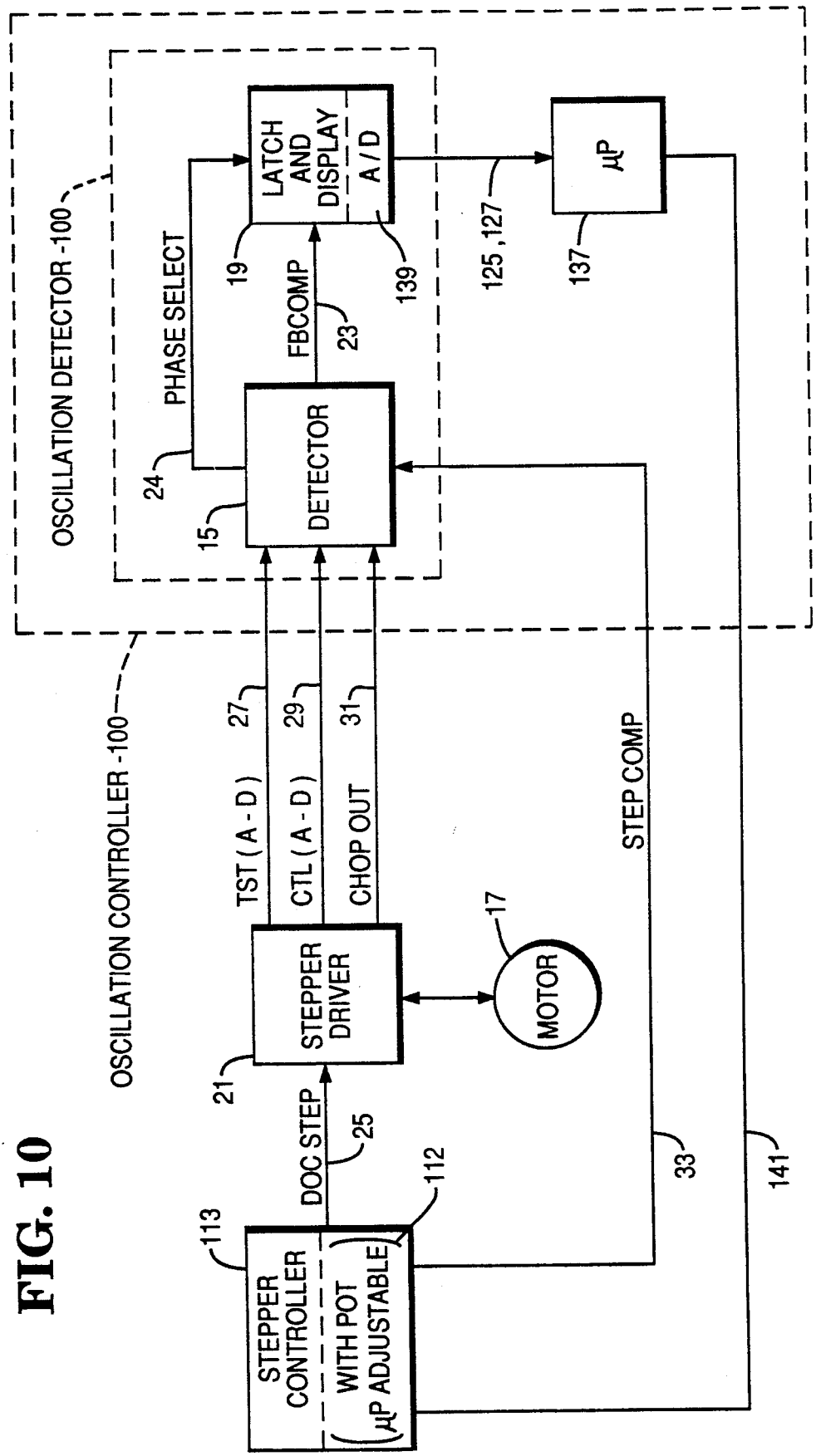
FIG. 10 is a block diagram showing an alternative embodiment of the present invention including a microprocessor coupled to the oscillation indicator circuit and to a stepper controller circuit with a microprocessor-adjustable potentiometer.

FIG. 10 shows an alternative embodiment of the present invention in which the system operates in closed-loop mode as an oscillation controller 100. Oscillation controller 100 includes oscillation indicator 11 and a processor (microprocessor) 137. The associated stepper motor device includes a stepper controller 113 with a digitally controllable (microprocessor adjustable) potentiometer 112 (FIG. 11C), stepper driver 21 and motor 17. Potentiometer 112 includes a D/A (digital to analog) converter. The processor 137 is coupled to the potentiometer 112 for adjusting the potentiometer, and automatically damping motor oscillations. The microprocessor and the stepper controller 113 with the digitally controlled potentiometer 112 may be obtained commercially from various vendors. For example, microprocessor (e.g., model 8031) is commercially available from Intel Corporation, and the stepper controller with digitally controllable potentiometer (e.g., model 9104) is commercially available from Xicor Corporation.

Figure 11A:
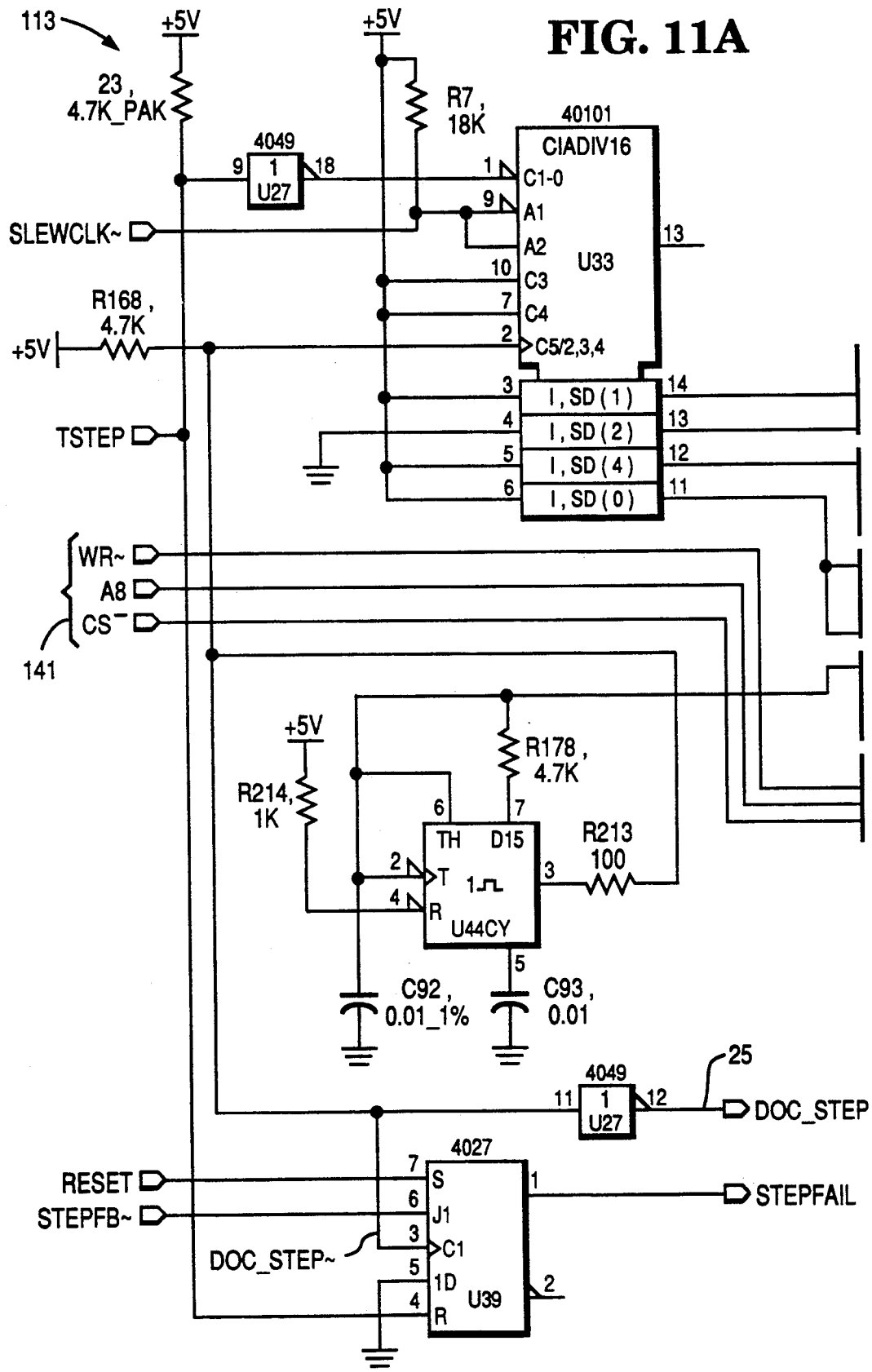
Figure 11B:
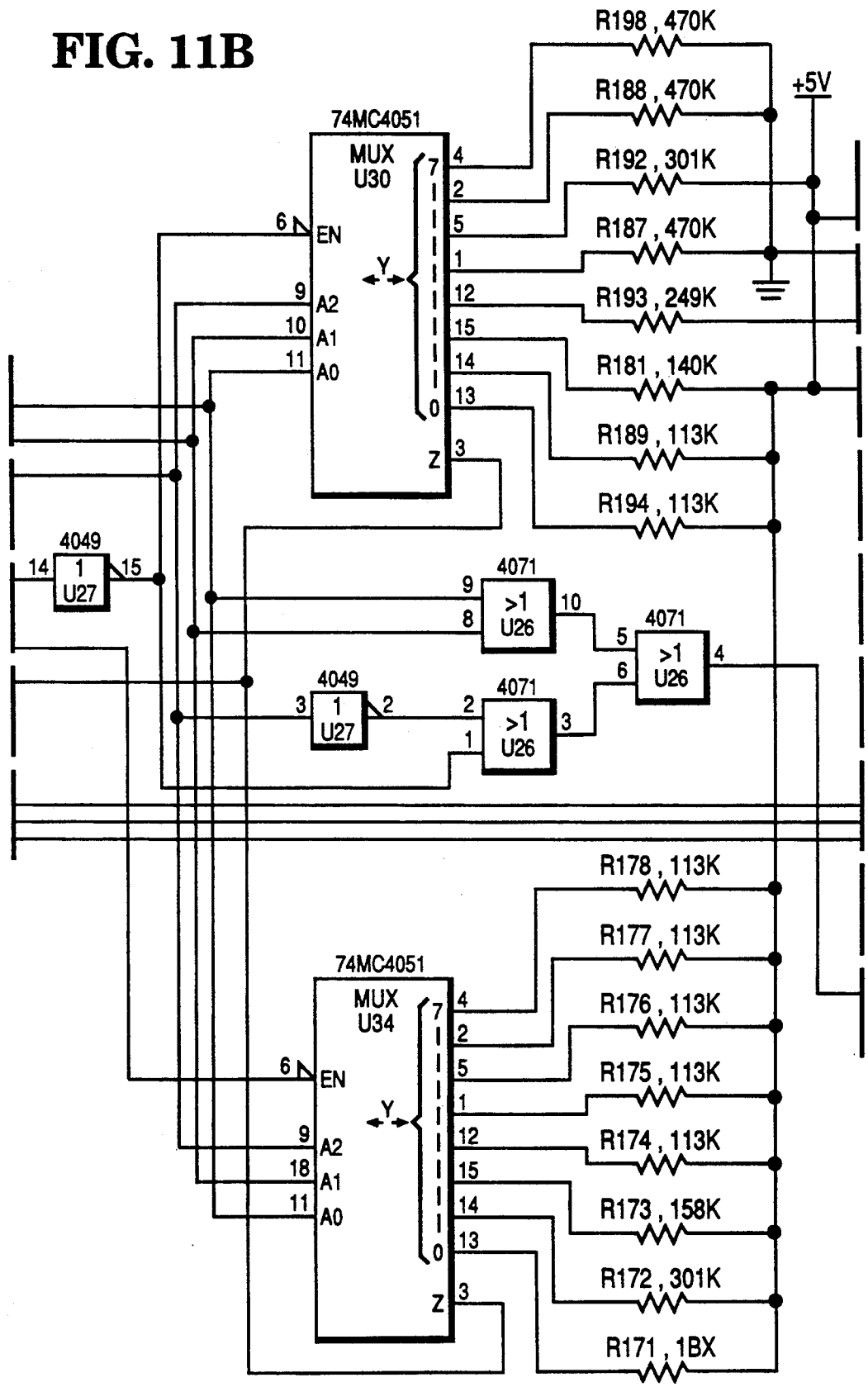

As shown in FIG. 10, in response to oscillation signals 125, 127 (which signals are converted from analog form to digital form by A/D converter 139 of latch and display circuit 19 (FIGS. 8 and 10)), microprocessor 137 produces a digital control signal 141. This signal 141 is then applied by processor 137 to potentiometer 112 of stepper controller 113 (upon conversion from digital to analog form by the D/A converter of the potentiometer 112) as a group of three signals (a chip-select-not signal (CS~), a write-enable signal (WR~), and a resistance-varying data signal (A8), as shown in FIG. 11A) for selecting and enabling the potentiometer and varying (adjusting) its resistance. Signal (CS~), when low (zero volts), selects the potentiometer 112, signal (WR~) enables the resistance on the potentiometer to change on the falling edge of the input signal (A8) when selected by signal (CS~). According to signal (A8), the resistance of the potentiometer goes up in value when this signal is high (five volts), and goes down when this signal is low, if selected by signal (CS~) and if the falling edge of signal (WR~) is detected.

Microprocessor 137 checks the values of the latched signal data on lines 125, 127. The latched signal data on lines 125 and 127 indicate the severity of the oscillations of the stepper motor. Line 125 provides low order bit data, and line 127 (which may be optional) provides high order bit data. Thus, where a "1" represents a 5-volt high state and "0" represents a zero-volt low state, the following bit combinations represent:

|  | High Order Bit (Line 127) | Low Order Bit (Line 125) |
| --- | --- | --- |
| Maximum Oscillations | 1 | 1 |
| (not represented) | 1 | 0 |
| Intermediate Oscillation | 0 | 1 |
| Minimum Oscillations | 0 | 0 |

If line 127 is omitted and only line 125 is included in the system, a bit value of "1" would represent maximum Oscillations, and a bit value of "0" would represent minimum oscillations. If the latched signal data on lines 125, 127 are found by microprocessor 137 to be high on average (i.e., high over the number of sequence steps, e.g., twelve steps), the microprocessor would apply a signal to the potentiometer 112 for adjusting the pot (a) down to an optimum position (corresponding to zero volts on lines 125, 127) if the potentiometer was previously in an above-optimum position, or (b) up to the optimum position, if the potentiometer was previously in a below-optimum position. The potentiometer is adjusted to produce the minimum "on" time (corresponding to a 1 or high state) for the signals on lines 125, 127. If the signals on lines 125, 127 are both low (zero state), no adjustment is made to the potentiometer.

The digitally controlled potentiometer 112 has 100 tap points on a serial array composed of 99 resistive elements. Each tap point increments/decrements the wiper value by 1/99th of the total resistance. Initially, the processor, not knowing the present state of the potentiometer, would increment the potentiometer to one end of the wiper (to an end representing 0 ohms, or to an end representing 100K ohms, for example). The processor would then increment/decrement the resistor steps to find the optimum wiper position for the best stepper motor response. The resistor range may be represented, for example, by twenty resistor steps of five resistor increments/decrements each. At the end of each five step increment/decrement, the microprocessor would check the input lines 125 and 127 to determine their state (high or low), and would average the states over the number of 12-step stepper motor operations, according to the signal data from latches 119 and 121. The microprocessor would then store the data for each five-resistor step increment/decrements, and, after completing the twenty five-resistor DM May 28, 1991 step increment/decrements, would determine the best response (optimum resistive position corresponding to zero volts on lines 125, 127), and step the potentiometer to this position.

While the present invention is susceptible of embodiment in various forms, there is shown in the drawings and described in the specification a presently preferred embodiment, with the understanding that the present disclosure is to be considered as an exemplification of the invention, and is not intended to limit the invention to the specific embodiment illustrated.

What is claimed is:

1. A system for representing the magnitude of oscillations in a stepper motor, the system comprising an oscillation indicator means coupled to said motor for providing an indication of oscillation of said motor during execution of a step in response to an applied step pulse of predetermined duration, the indication being representative of the extent of a back electromotive force of said motor, said oscillation indicator means includes;
    a signal detector means for detecting said back electromotive force and producing a sampled back electromotive force signal in response thereto;
    at least one peak detector means for comparing said sampled back electromotive force signal with a reference voltage level and for producing an output signal when said sampled back electromotive force signal is greater than said reference voltage level; and
    at least one display means for displaying said output signal, said output signal being representative of the magnitude of said sampled back electromotive force signal.

2. A system for reducing oscillations of a stepper motor, said motor responsive to varying resistances of a potentiometer, the system comprising:
    oscillation indicator means coupled to said motor for providing an indication of oscillation of said motor during execution of a step in response to an applied step pulse of predetermined duration, the indication being representative of a back electromotive force of said motor;
    said potentiometer being adjustable for reducing said oscillation, said back electromotive force and said indication.

3. A system as in claim 2 wherein said oscillation indicator means includes a detector means for detecting said back electromotive force and producing a sampled back electromotive force signal.

4. A system as in claim 3 wherein said oscillation indicator means also includes a means for displaying at least one oscillation signal in response to said sampled back electromotive force signal.

5. A system as in claim 4 wherein said potentiometer is manually adjustable.

6. A system as in claim 5 wherein said system includes a processor coupled to the oscillation indicator means and to said potentiometer for automatically adjusting said potentiometer.

7. A system for reducing oscillation of a stepper motor, said motor responsive to varying resistances of a potentiometer, the system comprising:
    oscillation controller means coupled to said motor and to said potentiometer, and responsive to a back electromotive force of the motor for adjusting said potentiometer, reducing said oscillation and said back electromotive force.

8. The system as in claim 7 wherein said oscillation controller means includes an oscillation indicator means and a processor means.

9. The system as in claim 9 wherein said oscillation indicator means includes a detector means for detecting said back electromotive force and producing a sampled back electromotive force signal.

10. The system as in claim 9 wherein said oscillation indicator means also includes a means for producing at least one oscillation signal in response to said sampled back electromotive force signal.

11. A method of reducing oscillation of a stepper motor, said motor responsive to varying resistances of a potentiometer, the method comprising the steps of:
    producing an indication of oscillation of the motor, said indication being representative of a back electromotive force of the motor; and
    adjusting said potentiometer to a selected resistance level for reducing said indication and said oscillation.

12. The method of claim 11 where the step of producing includes the step of detecting said back electromotive force.

13. A system as claimed in claim 12 wherein the duration of said applied step pulse is responsive to a potentiometer.

14. A system as claimed in claim 13 wherein said display means is a light emitting diode.

15. A method of adjusting an open loop stepper motor system to minimize oscillations, said adjustment being performed as part of an adjustment procedure comprising the steps of:
    (A) applying a predetermined sequence of step pulses to said stepper motor;
    (B) monitoring a plurality of output LEDs for an indication of the extent of oscillations of said stepper motor;
    (C) adjusting a potentiometer to reduce said oscillations as indicated by said LEDs flickering on and off; and
    (D) repeating steps A, B, and C until said oscillations are minimized as indicated by said LEDs remaining in an off-state as said predetermined sequence of steps is applied to said stepper motor.

16. The method as claimed in claim 5 in which said adjusting step (C) is effected by adjusting the last of said step pulses in said predetermined sequence 17. A system as claimed in claim 16 wherein said stepper motor is operated in an open loop mode.

* * * * *